United States Patent [19]

Tahara

[11] Patent Number: 4,806,990
[45] Date of Patent: Feb. 21, 1989

[54] PHOTOGRAPHIC PRINTING METHOD
[75] Inventor: Syuji Tahara, Kanagawa, Japan
[73] Assignee: Fuji Photo Film Co., Ltd., Kanagawa, Japan
[21] Appl. No.: 108,620
[22] Filed: Oct. 15, 1987
[30] Foreign Application Priority Data Oct. 15, 1986 [JP] Japan .............................. 61-244357
Oct. 15, 1986 [JP] Japan .............................. 61-244358

[51] Int. Cl.$^4$ ............................................ G03B 27/32
[52] U.S. Cl. ....................................... 355/77; 355/41; 355/75
[58] Field of Search ...................... 355/77, 53, 40, 41, 355/75

[56] References Cited
U.S. PATENT DOCUMENTS

| | | | |
|---|---|---|---|
| 3,768,905 | 10/1973 | Williams | 355/77 |
| 4,099,862 | 7/1978 | Bickl et al. | 355/77 |
| 4,152,068 | 5/1979 | Bickl et al. | 355/77 |
| 4,175,856 | 11/1979 | Pone | 355/77 |
| 4,293,215 | 10/1981 | Rosborough et al. | 355/77 |

Primary Examiner—Monroe H. Hayes
Attorney, Agent, or Firm—Sughrue, Mion, Zinn, Macpeak, and Seas

[57] ABSTRACT

A photographic printing method for making prints from a negative film comprises two stages; a negative inspection stage and a printing stage. In the negative inspection stage the negative film is intermittently advanced in one direction to place automatically each image frame of the negative film in a printing station and then is manually corrected in position so as to store data of corrected position of the image frame. After the negative inspection, each image frame is measured to detect image information thereof. On the other hand, in the printing stage, the negative film is intermittently advanced and automatically placed in the printing station with reference to the data of corrected position in order to effect the printing.

4 Claims, 6 Drawing Sheets

PHOTOGRAPHIC PRINTING METHOD

BACKGROUND OF THE INVENTION

The present invention relates to a photographic printing method.

In conventional photographic printing methods, an original film from which prints are made is passed through a printing gate of a printer once. Specifically, image frames of the original film are placed in the printing gate in order and measured to detect image information of the respective images. Based on the detected image information of each image frame, the photographic printer calculates a proper exposure and makes a print according to the calculated exposure. In such printing methods, because the measurement and the printing are alternatively effected, printing operation is inefficient, laborious, tedious and probably expensive.

To achieve a high rate of efficiency in printing operation proposed in, for example, Japanese Patent Unexamined Publication No. 61-91,648 is a printing method in which an original film is forwarded, frame by frame, to measure the respective image frames so as to detect image information thereof and thereafter, the original film is reversed to make prints frame by frame and printed by automatic exposure control according to the detected image information of the respective images. For printing in the method taught by the above Publication, a notch sensor is provided in the photographic printer to detect notches formed in one side margin of the negative film, one for each frame, so as TO automatically place each frame correctly in a printing station. The notch is formed on a transversal center line of each frame to be printed. However, the notch may mistakenly be formed at a short distance from the center line. Since a frame whose notch is away from the center line is placed in incorrect printing position an incomplete image is projected on a photographic paper. Upon measuring a frame image to detect image information necessary for printing a blank space between frames is partially scanned by a scanner. Therefore, accurate image information cannot be recorded.

In the case of a negative film having no notches, it is necessary to advance the negative film either by a predetermined constant length so as to place each frame at a correct position in the printing station or by detecting a border between a frame and a blank space adjacent to the frame by means of a scanner so as to place the detected border at a predetermined position. However, because blank spaces between frames are not always equally dimensioned or because the border between a frame and a blank space adjacent to the frame is not always sharp for some images, in particular images of scenes including an artificially lightened object at a center thereof, it is often hard to automatically place the respective frame in a correct position.

OBJECT OF THE INVENTION

It is, therefore an object of the present invention to provide a method by which each frame of a negative film can always be positioned at a correct printing position.

SUMMARY OF THE INVENTION

According to the present invention the photographic printing method for making prints from a negative film having a plurality of image frames comprises a negative inspection stage and a printing stage. The inspection stage includes the steps of intermittently advancing the negative film in one direction to automatically place each of the image frames in a printing station to effect a negative inspection frame by frame, manually correcting the image frame in position and storing data of corrected position of the image frame, and measuring each image frame information thereof. The printing stage, following the negative inspection stage, includes the step of intermittently advancing the negative film either in said one direction or in another direction opposite to said one direction to automatically correctly place the image frames in the printing station with reference to said data of corrected position in order to effect the print of the image frame, frame by frame.

In accordance to a preferred embodiment of the present invention, the negative inspection stage includes the additional step of specifying an image frame not to be printed based on a visual inspection. The specified image frame is automatically omitted in the printing stage.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
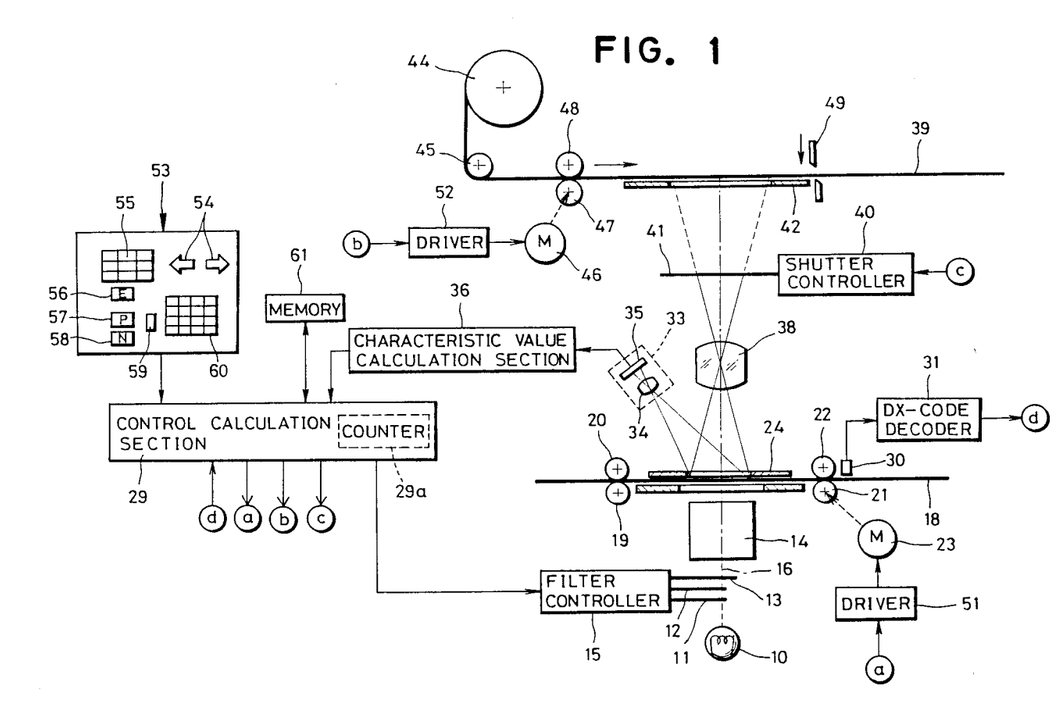
FIG. 1 is a schematic illustration of a photographic printer embodying the method of the present invention.

Referring now to FIG. 1, showing a photographic printer embodying the present invention, there is a white light source 10 from which white light emanates and a mixing box 14 so arranged as to illuminate a color negative film 24, with the result that diffused light emerges from the back of the color negative film 24. Provided between the light source 10 and the mixing box 14 are three color filters 11 to 13, namely cyan, mazenta, and yellow, for cutting off the corresponding complementary color components of the printing light, namely red, green and blue, respectively. A filter controller 15 controls which of the three color filters 11 to 13 are to enter into the optical path 16 of a projecting lens 38. A shutter 41 is provided to allow the light, which has passed through a frame of the color negative film 24 placed in a printing station, to reach a color photographic paper 39. The color negative film 24 is forwardly advanced from the left to the right with respect to the printing station by means of two pairs of rollers 19, 20 and 21, 22 disposed on both sides of the printing station. The rollers 19 and 21 cooperate by means of, for example, a chain and are coupled to a reversible electric motor 23 to rotate. The color negative film 24 is, upon printing, pressed by the mask plate 18, thus being retained in the shape of a frame, flat in the printing station. However, the mask plate 24 is adapted to be lifted slightly by means of, for example, a solenoid when the color negative film 24 is advanced.

Adjacent to the roller 22, there is a DX-code sensor 30 for detecting a DX-code (shown at 72 in FIG. 5) which is representative of the type of the color negative film 24 and is recorded on a side margin of the color negative film 18. A DX-code signal from the DX-code sensor 30 is transmitted to and decoded by a DX-code decoder 31 to provide film type information which in turn is transmitted to a control/calculation section 29.

In the step of negative inspection, a scanner 33 scans many points of an image of the frame placed in the printing station to provide image information. This scanner 33, which comprises a lens 34 and an image area sensor 35, measures a transmission density of each point of the image as the image information. A signal from the scanner 33 is transmitted to a characteristic value calculation section 36 for calculating characteristic values such as a mean transmission density, a maximum density, a minimum density and a mean value of mean transmission densities of the respective frames for each color. The calculated characteristic values are then transmitted to the control/calculation section 29.

Overhead the printing station a printing lens 38 is provided to form an enlarged image of the frame at the printing station on the color photographic paper 39. Between the color photographic paper 39 and the printing lens 38, there is a shutter 41, controlled to open and close by a shutter controller 40, and a mask plate 42 defining a printing image area of the color photographic paper 39.

The color photographic paper 39 is withdrawn from a roll 44 on a frame by frame basis by passing through a guide roller 45 by means of motor driven withdrawing roller 47 in cooperation with a pressure roller 48. The withdrawing roller 47 is driven by a pulse motor 46. Opposite to the withdrawing roller 47 with respect to the mask pate 42, there is a cutter 49 which is operated to cut the color photographic paper 39 to separate an exposed part of the photographic paper 39 after a predetermined number of exposures. The exposed and separated part of the photographic paper 39 is forwarded to a conventional photographic processing apparatus, not shown in FIG. 1.

The pulse motors 23 and 46 can rotate in both directions and their angle of rotation is controlled by the control/calculating section 29 through drivers 51 and 42 respectively. The control/calculation section 29 includes a conventional micro-computer to control operations of the filter controller 15 and the shutter controller 40. The photographic printer is cooperated with a keyboard 53 in order to enter commands into the control/calculation section 29. The key board 53 has film locating keys 54 for relocating correctly the color negative film 18, a color-density correction key arrangement 55 for color and/or density corrections, an inspection end key 56, a print start key 57, a print escape key 58, a start key 59, an alphabet-numeral key arrangement 60 and so forth. Denoted at a numeral 61 is a memory.

Figure 2:
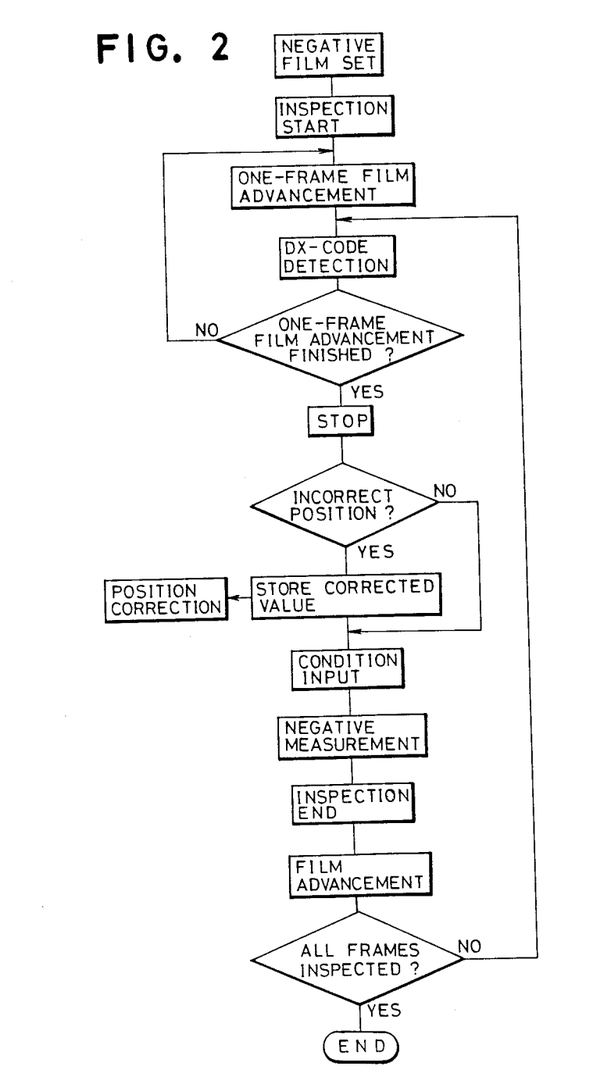
FIG. 2 is a flow chart showing the sequence of negative inspection stage.
Figure 3:
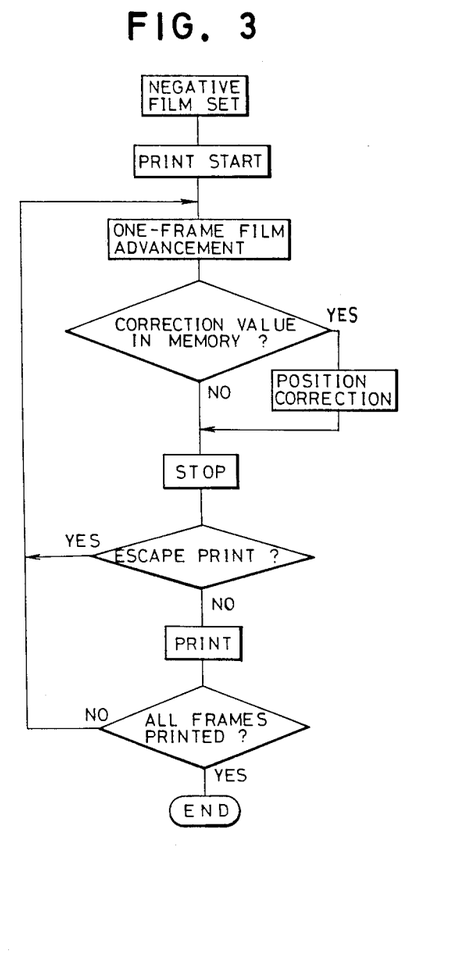
FIG. 3 is a flow chart showing the sequence of printing stage.

Reference is now made to FIGS. 2 and 3 showing the sequences of negative inspection and printing. For subjecting the color negative film 18 to negative inspection, the color negative film 18 is forwardly advanced by the feed rollers 19 and 20 to locate the leading end thereof at a predetermined position in the printing station with reference to, for example, a leading end mark in the printing station. The start key 59 is pushed to operate the control/calculation section 29, causing the driver 51 to make the pulse motor 23 produce a predetermined number of steps of rotation. In consequence, the motor driven roller 21 and 19 are rotated so as to forwardly advance the color negative film 18, namely from the left to the right as viewed in FIG. 1.

Upon forwardly advancing the color negative film 18, the DX-code sensor 30 detects a DX-code on the color negative film 18 to provide the DX-code decoder 31 with a DX-code signal. In the DX-code decoder 31, the type of the color negative film 18 is discriminated based on the DX-code signal. The DX-code decoder 31 provides the control/calculation section 29 with exposure control information according to the discriminated film type. Then the pulse motor 23 is actuated to advance forwardly the color negative film 18 so as to place the first frame in the printing station.

If the first frame of the color negative film 18 is placed incorrectly in the printing station once the pulse motor 23 stops its rotation, either one of the film locating keys 54 is operated according to the stopped position of the color negative film 18 so as to shift and correct the first frame in position. The number of steps of rotation which the pulse motor 23 has made to shift the color negative film 18 to the correct position is stored as a corrected value in the memory 61.

After the positional correction of the first frame of the color negative film 18, the negative inspection is effected for the first frame. As a result of the inspection, if the first frame is evaluated to be improper to make a print thereof with proper color balance and/or density by an automatic exposure control, a color/density correction key of the color/density correction key arrangement 55 is operated to set manually a changed exposure control condition in the photographic printer. If no print is needed from the first frame, the print escape key 58 is operated.

After the entering of necessary correction values, the first frame is measured to detect densities. For this measurement, the scanner 33 is actuated to detect transmission densities for three colors, namely red, green, and blue, as to a great number of points of the image of the first frame. The three color densities of each point detected by the scanner 33 are transmitted to the characteristic value calculation section 36 to draw a characteristic value or values such as a mean transmission density, a maximum density, a minimum density, densities of specified points and the like. These characteristic values are transmitted to the control/calculation section 29. Based on the characteristic values and correction values of the exposure control condition, the control/calculation section 29 calculates a proper exposure which in turn is stored in the memory 61. Thereafter, the inspection end key 56 is operated to finish the negative inspection and to actuate the pulse motor 23 again so as to advance forwardly the color negative film 18 by the predetermined number of steps of rotation. The same sequence as described as to the first frame is repeated for the second frame of the color negative film 18.

After the completion of the negative inspection for all frames of the color negative film 18, the color negative film 18 is unloaded from the photographic printer and then is reloaded with the first frame first. After this reloading, the sequence for printing shown by the flow chart of FIG. 3 is executed. In this printing stage, the pulse motor 23 advances forwardly the color negative film 18 by a predetermined amount to place the first frame in the printing station. If the first frame is incorrectly placed in the printing station, the film location key 54 is operated so that the pulse motor 23 is caused to rotate according to the corrected value stored in the memory 61.

After the relocation of the first frame of the color negative film 18 in the correct position, the control/calculating section 29 reads out the information as to whether the first frame is required to be printed or not and, if not required, causes the pulse motor 23 to advance forwardly the color negative film 18 so as to place the second frame in the printing station. On the other hand, when the first frame is required to be printed, the control/calculate section 29 reads out the data of exposure for the respective colors and causes the filter controller 15 to control the color filters 11 to 13 to enter into the optical path 16 so as to regulate the color components of the printing light according to the data of exposure. Following this filter control, the shutter controller 40 is actuated to open the shutter 41 for a certain time, allowing the color photographic paper 39 to ne exposed to the regulated printing light. It is desirable to control exposures taking a mean density of mean densities of all frames into account so as to make prints with a substantially same color balance.

After the completion of printing of the first frame, the pulse motor 46 is caused to rotate by a predetermined number of steps so as to advance forwardly the color photographic paper 39 to the exposure station. Simultaneously, the filter controller 15 retracts and places the color filters 11 to 13 in their initial positions. Thereafter, the pulse motor 23 is again caused to rotate so as to place the second frame of the color negative film 18 at the correct position in the printing station in the same manner as described for the first frame. For the second frame, the same printing sequence is repeated. In this way, all frames of the color negative film 18 are printed on the color photographic paper 39.

Immediately after the completion of the printing of all frames of the color negative film 18, the cutter 49 is activated to cut off the exposed part of the color photographic paper 39 and which is then forwarded to the processor. The exposed and separated part of the color photographic paper 39 is, after photographic processing cut into separate frames.

In the above described embodiment, although the number of steps of rotation which the pulse motor 23 has made to shift the color negative film 18 to the correct position in the printing station is stored as the positional corrected value in the memory 61, nevertheless, a position of each frame from a reference position may be stored in place of the positional corrected value in the memory 61.

Figure 4:
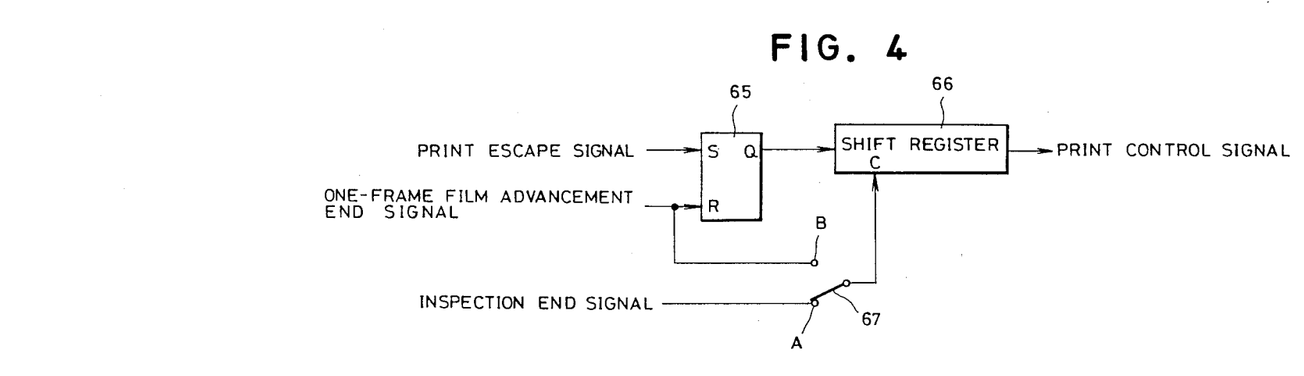
FIG. 4 is a block diagram showing a circuit for providing a print control section with signals representative of image frames not to be printed.

Referring to FIG. 4 showing a circuit for forwarding the color negative film 18 to prevent exposure of a frame, a flip-flop 65, which is set by a print escape signal and reset by a film advancement end signal, is connected to a shift register 66 at an output terminal Q. A changeover switch 67, which is connected to a contact A in the negative inspection stage, transmits an inspection end signal as a clock signal to the shift register 66 through the inspection end key 56. In the printing stage, the changeover switch 67 is turned over to connect the contact B to transmit a film advancement end signal as a clock signal to the shift register 66.

In the negative inspection stage, transmitted as a print control signal to the shift register 66 through the flip-flop 65 is a logic signal "0" for a frame to be printed and a logic signal "1" for a print escape frame. When the negative end key is operated, a clock signal as an inspection end signal is applied to the shift register 66. As a result, the control signals in the register 66 which have been transmitted from the flip-flop 65 is shifted slightly.

In the printing stage, because of the changeover switch 67 connected to the contact B, the print control signal is retrieved from the shift register 66 every one-frame advancement of the color negative film 18 in order of frame numbers. If the retrieved printing control signal is of the logic signal "0" which means to escape to print, the color negative film 18 is advanced by one frame without being subjected to printing.

Figure 5:
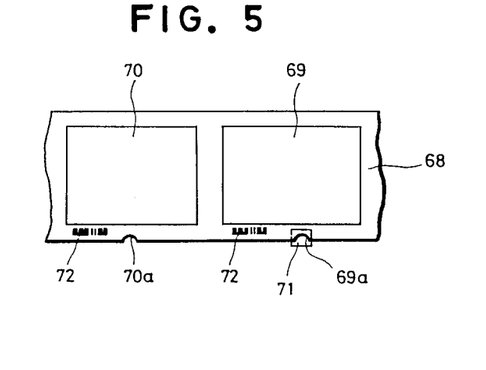
FIG. 5 is a plane view showing partially a negative film with notches formed therein.
Figure 6:
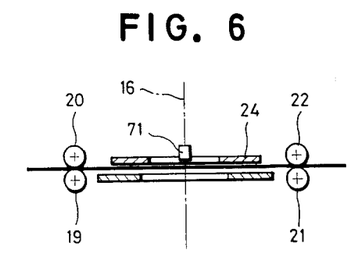
FIG. 6 is an illustrative side view showing a notch sensor arrangement.

In the case of a notched film the one-frame film advancement will be effected with reference to a single notch formed in each frame. In more detail, as is shown in FIG. 5, a negative film 68 is formed notches 69a, 70a, in one marginal portion thereof, each notch being located on a transversal center line of each frame 69, 70 which is decided to be printed from the negative inspection. For detecting the notch, the photographic printer is provided with a notch sensor 71 on one side of the printing station. As is shown in FIG. 6 the notch sensor 71 is located on a transversal center line of the printing station. The notch sensor 71 detects a notch to provide a notch signal which in turn is transmitted to the control/calculation section 29. Although in this embodiment a reflection type photo-sensor is used for the notch sensor 71, nevertheless, it may be permissible to use a transmission type photo-sensor comprising a light emerging element and a light receiving element disposed opposite to each other.

Figure 7:
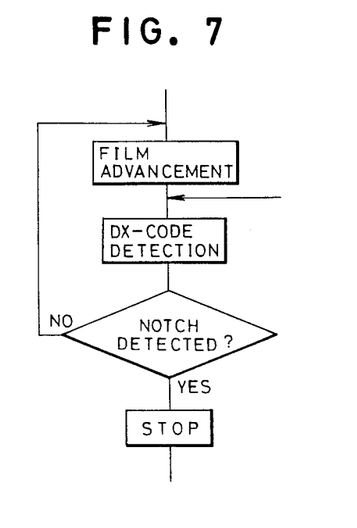
FIG. 7 is a flow chart showing an automatic film advancement of the negative film of FIG. 5.

As is shown in FIG. 7, if the notch sensor 71 detects a notch when the negative film 68 is being forwarded, a notch signal is produced by which the pulse motor 23 is stopped. It should be noted that, if the notch is formed with a deviation from the transversal center line of the frame, the frame is not placed accurately in the printing station. For this reason, either one of the film locating keys 54 is operated so as to adjust the position of the frame. As is previously described, when the film locating keys 54 are operated, the pulse motor 23 rotate forwardly or reversely to relocate the frame. The amount of adjustment is stored in the memory 61. In printing stage, the negative film 68 is positioned accurately in the printing station by the relocation thereof which is performed by shifting the negative film 68 by the amount of adjustment from a position wherein the negative film 68 is stopped by the detection of the notch.

In place of detecting notches on the negative film, a detection of frames is permissible to forward the negative film. In case of detecting the respective frames of the negative film the scanner 33 for measuring the density of image is used to, detect an image frame. The negative film can be positioned properly in the printing station by the scanner which is positioned to receive the image frame at the center of the image sensor.

Figure 8:
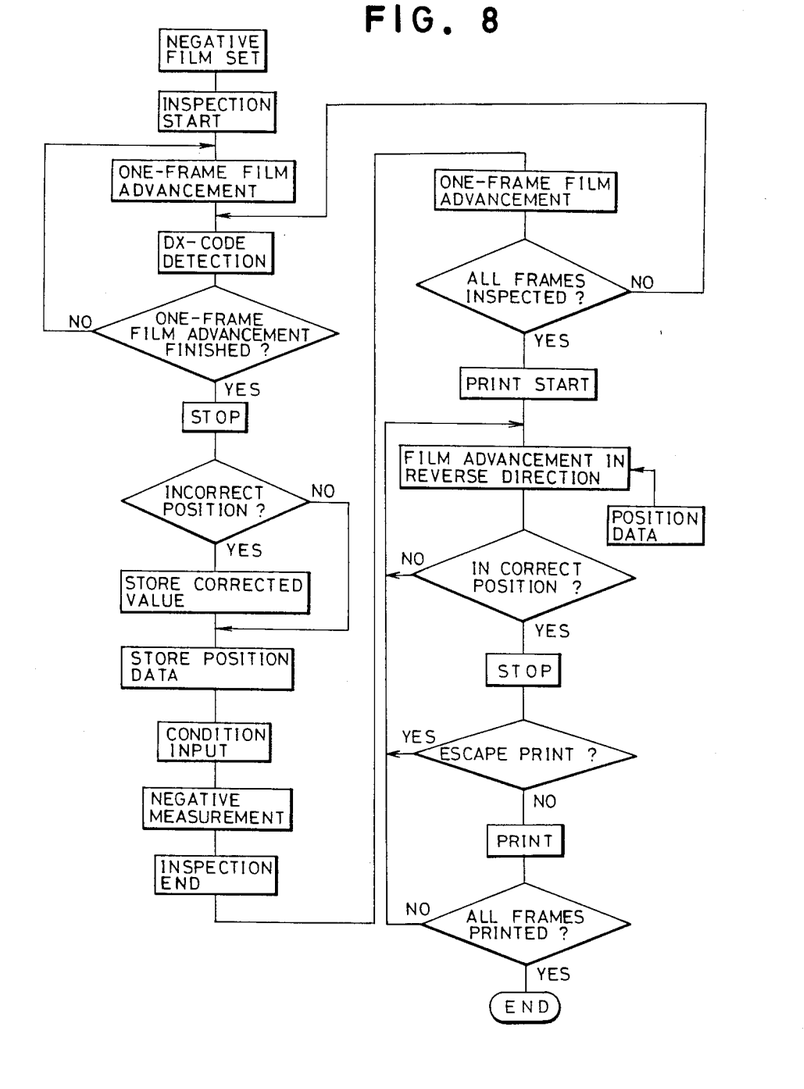
FIG. 8 is a flow chart showing a printing sequence of another preferred embodiment of the present invention.

FIG. 8 shows another sequence of executing continuously negative inspection and printing. For this sequence, the photographic printer shown in FIG. 1 is so modified as to advance reversely the color negative film for printing following the negative inspection. Specifically the pulse motor 23 reversely rotates in the printing stage to advance the color negative film 18 from the right to the left as viewed in FIG. 1. Furthermore, a counter 23a is provided in the control/calculation section 29. The counter 29a counts up the number of steps of rotation which the pulse motor 23 has made to correctly place the first frame of the color negative film to be inspected. The step number counted by the counter 29a is stored as a corrected position signal or corrected value in the memory 61. In the same way, the corrected position signals for the respective frames are stored in the memory 61.

After the completion of negative inspection of all frames of the color negative film 18, the print start key 57 is operated to start the pulse motor so as to advance rearwardly and place the color negative film 18 in the printing station the rearwardmost frame first. Simultaneously with the start of the pulse motor 23, the counter 29a starts to count down one every step of rotation of the pulse motor 23. The pulse motor 23 continues to rotate until the content of the counter 29a coincides with the positional data stored in the memory 61. When the coincidence occurs, the pulse motor 23 stops to fix the color negative film 18 so as to locate the frame in the printing station at the same correct position as in the inspection stage. As the remaining part of the sequence shown in FIG. 8 is executed in the same way as that shown in FIGS. 2 and 3, the description thereof is omitted herein.

It is believed that the advantages in and improved results furnished by the method of the present invention are apparent from the foregoing description of the various embodiments of the invention. Changes and modifications can be made without departing from the true scope of the present invention as thought to be construed therein.

What is claimed is:

1. A photographic printing method for making prints from an original film having a plurality of image frames, said method comprising a negative inspection stage wherein said original film is intermittently advanced in one direction to place said image frames in a printing station in order to inspect said image frame, frame by frame, and a printing stage wherein said image frames are printed on a photographic paper, frame by frame, including the steps of:

automatically placing each of said image frames in at least close proximity to said printing position for said negative inspection;

manually correcting any positional error of said each image frame with respect to said printing position to locate said each image frame in a corrected position and storing data of said corrected position of said each image frame;

measuring said each image frame to detect image information thereof; and intermittently advancing said negative film to automatically place said image frames in said printing station with references to said data of said corrected position in order to effect said printing stage.

2. A photographic printing method as defined in claim 1, further including the steps of specifying an image frame not to be printed upon said negative inspection and not printing said specified image frame.

3. A photographic printing method as define in claim 1, wherein, in said printing stage, said negative film is advanced in said one direction.

4. A photographic printing method as defined in claim 1 wherein, in said printing stage, said negative film is advanced in another direction opposite to said one direction.

* * * * *